Oct. 27, 1959 A. KEEFE 2,910,106
INSERT FOR PNEUMATIC TIRES
Filed Sept. 25, 1953

INVENTOR.
ARTHUR KEEFE
BY
J. William Freeman
ATTORNEY

United States Patent Office 2,910,106
Patented Oct. 27, 1959

2,910,106

INSERT FOR PNEUMATIC TIRES

Arthur Keefe, Akron, Ohio

Application September 25, 1953, Serial No. 382,395

5 Claims. (Cl. 152—363)

This invention relates to pneumatic tires and in particular relates to a pneumatic tire wherein the use of the conventional inner tube is obviated.

In the past, efforts toward elimination of the use of the conventional inner tube have been directed in the main, towards the establishment of an air-tight seal between the bead portion of the tire casing and the rim upon which the same is mounted. Several concepts have been advanced for effectuating this requisite seal but in each case the effectiveness of the tire during operation is directly proportional to the effectiveness of the air-seal between the tire casing and rim. Failure of this seal results in escapement of air from within the tire casing with resultant failure of the tire.

Accordingly, it is one object of this invention to provide an independent unit, capable of being positioned between the beads of a tire casing to provide an auxiliary force urging said beads into air-tight engagement with the rim.

It is a further object of this invention to provide an insert that is tensionally positionable between the beads of tire casing whereby said beads are urged apart against said rims.

It is a still further object of this invention to provide an insert, that is adaptable to use either in combination with a tire casing alone, or with an auxiliary member positionable within or integral with a tire casing.

It is a still further object of this invention to provide an insert capable of performing the above functions in addition to provide an auxiliary point of seal against the escape of air.

These and other objects of the invention will become more apparent upon a reading of the following brief specification taken in the light of the accompanying drawings.

Figure 1:
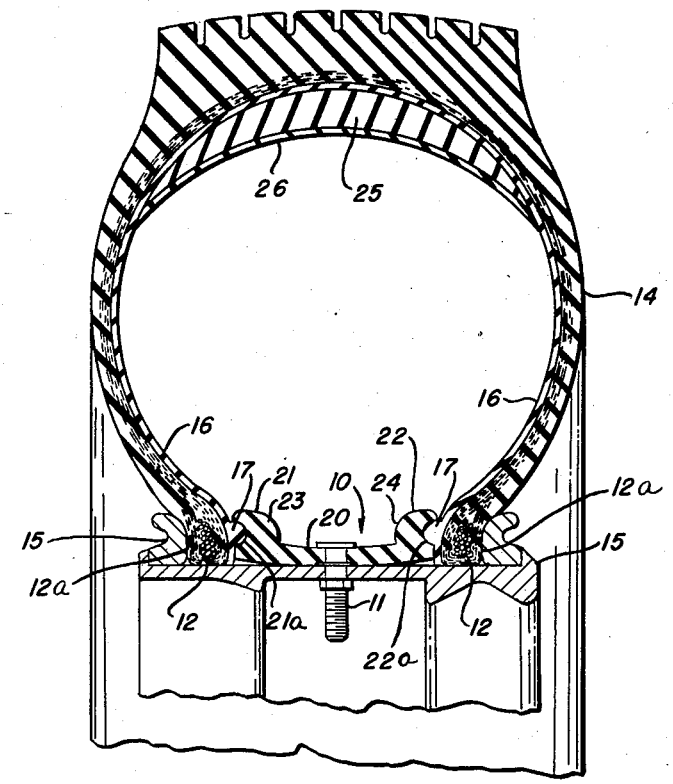
Figure 1 is a side elevation, partly broken away and in section, and showing the preferred form of the invention.

Referring now to the drawings and in particular to Figure 1 thereof, the improved insert means, generally indicated as 10, together with the valve means 11 incorporated therein, is shown positioned between the bead portions 12, 12 of a tire casing 14 that is in turn mounted on a conventional tire rim 15, in known manner.

While the principle of operation of the insert 10 dictates that the same could be employed in conjunction with various forms of tire casings as will be described more fully in later paragraphs, the preferred embodiment of the novel insert 10 shown in Figure 1 contemplates utilization in conjunction with a tire casing 14, that is provided with specially designed air-impervious internal wall portion 16, which may be formed integral, as by vulcanization, with the body of the casing 14, and including a pair of circumferentially-extending annular ribs 17, 17, that are cooperatively engageable with the insert 10 in a manner to be described.

To this end, the insert 10 is shown as comprising an endless strip 20 of resilient material, the opposed edge portions 21, 22 of which, are defined by corresponding endless flanges 23, 24, respectively, that are shown circumferentially engaging the air-impervious internal wall portion 16 in the region adjacent the bead portion of the tire casing. For the purpose of preventing shifting of the edge portions 21, 22 with respect to the tire casing 14, the axially spaced edge portions 21, 22 are shown provided with endless circumferentially extending grooves 21a, 22a, respectively, that are designed for cooperative reception with the annular ribs 17, 17 provided on the internal wall 16. (See Figure 1.)

Because the insert 10 is intended to increase the effectiveness of the seal between the external face 12a, of the beads 12, 12, and the rim 15, the lateral width of the insert 10 (between the opposed axially spaced edge portions 21, 22) is shown as being slightly greater than the lateral distance between the beads 12, 12, when the same are positioned on the rim 15. In this manner, the resilient insert 10, will be slightly distorted to the position of Figure 1, and in this position the inherent recovery properties that are characteristic of resilient material will operate to continually urge the beads 12, 12 into firmer engagement with the rim 15, thus decreasing the possibility of air leakage at this point. By like token, the inherent recovery properties of the insert 10 will operate to establish a primary sealing point at the juncture between the beads 12, 12, and the edge portions 21, 22 of the insert. It is, of course, manifest that the effectiveness of either of the aforementioned sealing points could be increased if deemed necessary, by utilization of a caulking compound of known use, between either (1) the exterior bead and the rim, or (2) between the interior bead and the edge portions 21 and 22.

Further prevention of escape of air from within the chamber defined by the internal wall 16 and the insert 10, may be provided for by equipping the air-impervious internal wall 16 with puncture sealant material 25, secured in place in the area adjacent to the crown portion of the casing 14 by a flap member 26 secured to the internal wall in known manner. Because the internal wall portion 16 may be made accessible upon removal of the insert 10, it is manifest that the puncture sealant 25, together with the flap 26, may be secured with respect to the internal wall 16, either during or subsequent to manufacture.

In use or operation of the improved insert 10, the same is first manually positioned with respect to the casing 14 with ribs 17, 17 being circumferentially positioned with the grooves 21a, 22a, respectively. In this position, the insert, being of greater lateral width than the normal lateral distance between the beads 12, 12, will operate to spread the beads 12, 12 apart from each other. With the beads 12, 12 in this extended position, the assembled tire casing 14 may then be mounted on the rim 15 in an uninflated condition by forcing the beads towards each other and into position on the rim 15. Because of the fixed nature of the rim 15, it is manifest that engagement of the uninflated, assembled casing therewith will result in a distortion of the insert 10 to the position of Figure 1. As previously explained, in this condition, the inherent recovery properties thereof, cause a continual separating pressure to be exerted against the beads 12, 12, by the edge portions 21, 22, thereof. Upon inflation through valve 11, this just described pressure will be augmented by pressure of the entrapped air against the face of the insert 10.

During the operation of the tire casing subsequent to mounting and inflation, two separate, circumferentially extending, points of seal will be provided to prevent the escape of air from the casing. The first or primary seal is established between the air-impervious internal wall member 16 and the edge portions 21 and 22 respectively. The second seal occurs between the rim 15 and the bead portions 12, 12. It is important to note, that, in each case, the effectiveness of the seal is increased by virtue of the recovery properties of the insert 10 operating against the beads 12, 12.

It will be seen from the foregoing that there has been provided a new and novel approach to the problem of retaining air within a tubeless tire, which approach is predicated upon the utilization of the recovery properties of a resilient insert to effectuate a highly satisfactory dual sealing condition.

Figure 2:
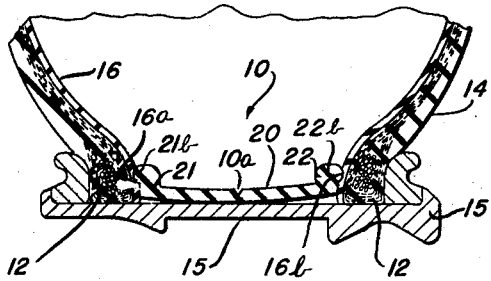
Figure 2 is a fragmentary side elevation, partly broken away and in section and illustrating a modification of the invention.
Figure 3:
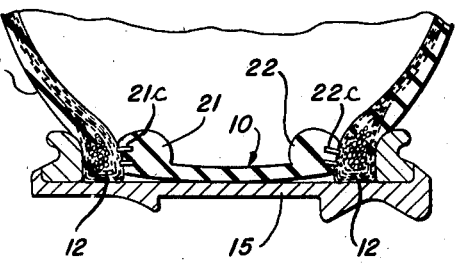
Figure 3 is a fragmentary side elevation, partly broken away and in section, and illustrating a further modification of the invention.

In Figures 2 and 3 there are illustrated modified forms of the invention similar in application to the form of the invention shown in Figure 1, but differing only with respect to the engagement between the edge portions 21, 22 of the insert 10, and the beads 12, 12. Accordingly like numerals indicate like parts.

In Figure 2, the edge portions 21 and 22 of the insert 10, are provided with circumferentially extending ribs 21b, 22b, designed for cooperative reception within circumferentially extending grooves 16a, 16b, that are provided in the internal wall 16. Further difference is found in the provision of an endless V-cut 10a, provided centrally of the insert 10, and designed to facilitate bending of the relatively stiff, but resilient insert 10.

The modification of the invention shown in Figure 3 is designed for use in conjunction with a standard pneumatic tire from which the inner tube has been removed. Accordingly, to this end, the edge portions 21 and 22 are shown provided, at scattered points around the circumference thereof, with a plurality of hard stud members 21c, 22c, the same being designed to dig into the beads 12, 12 and prevent shifting of the insert 10 with respect thereto, in much the same manner as the "male and female" connections of Figures 1 and 2.

Further modifications such as use of a separate mating member to be cooperatively received by the insert, may be resorted to without departing from the spirit thereof or the scope of the appended claims.

What is claimed is:

1. A sealing strip for use between the beads of a pneumatic tire, comprising; a unitary annular band of solid resilient material having inherent recovery properties; said band having spaced axial edge surfaces, a plurality of pin members imbedded in said band and projecting beyond said axial edge surfaces; said band having an axial width greater than its radial thickness; said band having a resistance to axial compression.

2. In combination with a pneumatic tire having axially spaced internal bead walls, a unitary annular band of resilient material of normally cylindrical configuration having its axially spaced edge portions mechanically interlocked with said spaced internal bead walls; said band having a greater axial width than the distance between the bead walls; said band, when interlocked with said bead walls, being distorted to substantially concavo-convex configuration, whereby said bead walls are urged apart by the inherent recovery properties of said edge portions of said band.

3. The combination of claim 2 further characterized by the fact that said mechanical interlock between said edge portions and said bead walls includes a continuous groove provided on each edge portion and a continuous projecting rib provided on each bead wall and being received in said groove.

4. The combination of claim 2 further characterized by the fact that said mechanical interlock between said edge portions and said bead walls includes a continuous rib provided on each edge portion and projecting axially therebeyond; and a continuous groove provided on each bead wall and receiving one of said ribs.

5. In combination with a pneumatic tire having axially spaced internal bead walls; a unitary annular band of resilient material of normally cylindrical configuration having its axially spaced edge portions mechanically interlocked with said spaced internal bead walls; said band having a greater axial width than the distance between the bead walls; said band, when interlocked with said bead walls, having its edge portions distorted radially outwardly with respect to the medial portion thereof, whereby said bead walls are urged apart by the inherent recovery properties of said edge portions of said band.

References Cited in the file of this patent

UNITED STATES PATENTS

| | | |
|---|---|---|
| 1,637,599 | Ballew | Aug. 2, 1927 |
| 2,113,031 | Merz et al. | Apr. 5, 1938 |
| 2,419,075 | Herzegh | Apr. 15, 1947 |
| 2,552,336 | Marcum | May 8, 1951 |
| 2,597,550 | Tritt | May 20, 1952 |
| 2,608,235 | Wyman | Aug. 26, 1952 |
| 2,674,292 | Sutton | Apr. 6, 1954 |

FOREIGN PATENTS

| | | |
|---|---|---|
| 10,272 | Great Britain | 1898 |
| 568,353 | Great Britain | Mar. 30, 1945 |
| 679,642 | Great Britain | Sept. 24, 1952 |
| 1,026,545 | France | Feb. 4, 1953 |